US008818613B2

(12) United States Patent
Becker et al.

(10) Patent No.: US 8,818,613 B2
(45) Date of Patent: Aug. 26, 2014

(54) APPLICATION FOR A COMMUNICATIONS AND PROCESSING DEVICE

(75) Inventors: Tyson Becker, Royal Oak, MI (US); Nicholis S Festa, Shaker Heights, OH (US); Kevin R. Krause, Plymouth, MI (US); Matthew C. Neely, Rochester, MI (US)

(73) Assignee: General Motors LLC, Detroit, MI (US)

( * ) Notice: Subject to any disclaimer, the term of this patent is extended or adjusted under 35 U.S.C. 154(b) by 278 days.

(21) Appl. No.: 13/315,796

(22) Filed: Dec. 9, 2011

(65) Prior Publication Data

US 2013/0151064 A1 Jun. 13, 2013

(51) Int. Cl.

*G01M 17/00* (2006.01)
*G06F 7/00* (2006.01)
*G06F 19/00* (2011.01)

(52) U.S. Cl.

USPC .............................. 701/31.5; 701/1; 701/31.4

(58) Field of Classification Search

None

See application file for complete search history.

(56) References Cited

U.S. PATENT DOCUMENTS

| | | | | |
|---|---|---|---|---|
| 6,429,773 | B1 | 8/2002 | Schuyler | |
| 6,564,127 | B1 | 5/2003 | Bauerle et al. | |
| 6,728,612 | B1 * | 4/2004 | Carver et al. | 701/34.3 |
| 6,915,126 | B2 * | 7/2005 | Mazzara, Jr. | 455/411 |
| 7,006,819 | B2 * | 2/2006 | Mazzara et al. | 455/418 |
| 2002/0184062 | A1 * | 12/2002 | Diaz | 705/7 |
| 2003/0046179 | A1 | 3/2003 | Anabtawi et al. | |
| 2004/0044454 | A1 | 3/2004 | Ross et al. | |
| 2004/0093154 | A1 * | 5/2004 | Simonds et al. | 701/200 |
| 2004/0093155 | A1 * | 5/2004 | Simonds et al. | 701/200 |
| 2005/0027438 | A1 * | 2/2005 | Rockett et al. | 701/200 |
| 2005/0288827 | A1 * | 12/2005 | Watkins | 701/1 |
| 2008/0161988 | A1 | 7/2008 | Oesterling et al. | |
| 2009/0088187 | A1 * | 4/2009 | Krause et al. | 455/466 |

* cited by examiner

*Primary Examiner* — Bhavesh V Amin

(74) *Attorney, Agent, or Firm* — Dierker & Associates, P.C.

(57) ABSTRACT

An application for a communications and processing device includes a computer program embedded on a non-transitory, tangible medium. The computer program includes computer readable code for establishing respective connections between the communications and processing device and a telematics unit of a vehicle, an information system of an original equipment manufacturer (OEM), and an information system of a dealer associated with the OEM. The application further includes computer readable code for at least i) tailoring at least one vehicle system of the vehicle with user-selected preferences, ii) tailoring a user account associated with the vehicle, and iii) providing information pertaining to the vehicle or to a program associated with the vehicle.

25 Claims, 10 Drawing Sheets

APPLICATION FOR A COMMUNICATIONS AND PROCESSING DEVICE

TECHNICAL FIELD

The present disclosure relates generally to applications for communications and processing devices.

BACKGROUND

Dealers of an original equipment manufacturer (OEM) often configure a new vehicle for a customer according to customer-selected preferences, settings, and/or options prior to delivery of the vehicle to the customer. Typically, a salesman or other personnel at the dealer configures the new vehicle with the customer selections and may, in some cases, provide instructional information to the customer. The instructional information may pertain to, e.g., setting up, using, and/or operating certain vehicle systems and/or services.

SUMMARY

An application for a communications and processing device includes a computer program embedded on a non-transitory, tangible medium. The computer program includes computer readable code for establishing respective connections between the communications and processing device and a telematics unit of a vehicle, an information system of an original equipment manufacturer (OEM), and an information system of a dealer associated with the OEM. The application further includes computer readable code for at least i) tailoring at least one vehicle system of the vehicle with user-selected preferences, ii) tailoring a user account associated with the vehicle, and iii) providing information pertaining to the vehicle or to a program associated with the vehicle.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the application, as disclosed herein, may advantageously be used to simplify a vehicle delivery process of a dealer of an OEM. The application is a web-based application, which may be accessed via a website (e.g., using a desktop computer, laptop, tablet computer, smartphone, etc.) or may be downloaded to a communications and processing device (such as a personal computer, a tablet computer, e.g., an iPad®, a smartphone, or the like) via some type of secure transmission protocol such as, e.g., hypertext transfer protocol secure (HTTPS). Due, at least in part, to the wireless connectivity capabilities of the tablet computer or smartphone, in some instances, the application may be accessed by the customer at any location, such as at the dealership, at the customer's home, and/or the like. Additionally, the website version of the application renders the application available whenever an Internet-connected device is available. As shown by the example of the application below, the customer may use the application at least to i) tailor one or more vehicle systems to customer-selected preferences, ii) tailor a user account associated with the vehicle, and iii) provide information pertaining to the vehicle or to a program associated with the vehicle.

Figure 1A:
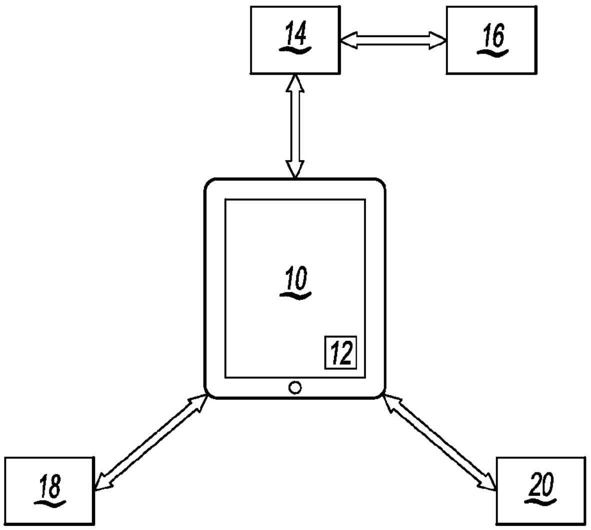
FIG. 1A is a schematic diagram illustrating a communications and processing device having an application resident thereon and various entities that may be connected to the communications and processing device through the application.
Figure 1B:
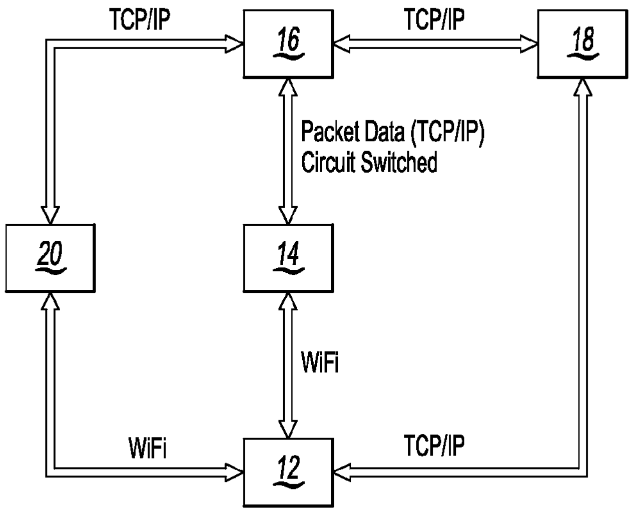
FIGS. 1B through 1E are respective schematic diagrams of examples of connections that can be made with the application of the a communications and processing device of FIG. 1A.

The application also enables the customer to establish connections between the communications and processing device and one or more of four particular entities (either directly, or through another of the entities). The entities and the general connections that may be made are shown in FIG. 1A. The entities include a telematics service center (TSP) 16 (e.g., to purchase telematics services, etc.), a telematics unit 14 operatively disposed in the vehicle (e.g., to configure vehicle systems according to customer-selected preferences, etc.), an information system of an OEM 18 (e.g., to obtain information pertaining to the vehicle brand, etc.), and/or an information system of a dealer 20 associated with the OEM (e.g., to view vehicle lease agreement, etc.). The connections between the device 10 and the entities 14, 16, 18, 20 may be made simultaneously when the application is accessed, e.g., by the customer. In this way, the device 10 may be connected (directly or indirectly) to all four of the entities 14, 16, 18, 20 at the same time, and the device 10 may be used (via the application 12) to retrieve information from and/or provide information to any of those entities in order to completely configure the customer's vehicle at one time.

It is to be understood that when discussing connections with the dealer 20 or the OEM 18, connections are made with communications and processing devices that are located at or otherwise associated with the dealer 20 or the OEM 18.

Specific connections that may be made between the application 12 and the various entities 12, 14, 16 and/or 18 are shown in FIGS. 1B through 1E. In the example shown in FIG. 1B, the application 12 acts as a command/control center and hub/gateway to manage the communications between itself and any of the individual entities 12, 14, 16, 18. In this example, the application 12 connects with the telematics unit 14 via a Wi-Fi™ connection, with the OEM via a TCP/IP (i.e., an Internet connection), and with the dealer 20 via a Wi-Fi™ connection. The telematics service center 16 and the telematics unit 14 are connected via a packet data session (i.e., a TCP/IP connection) or a circuit switched connection. The telematics service center 16 is also connected to the dealer 20 and the OEM 18 via respective TCP/IP connections.

Figure 1C:
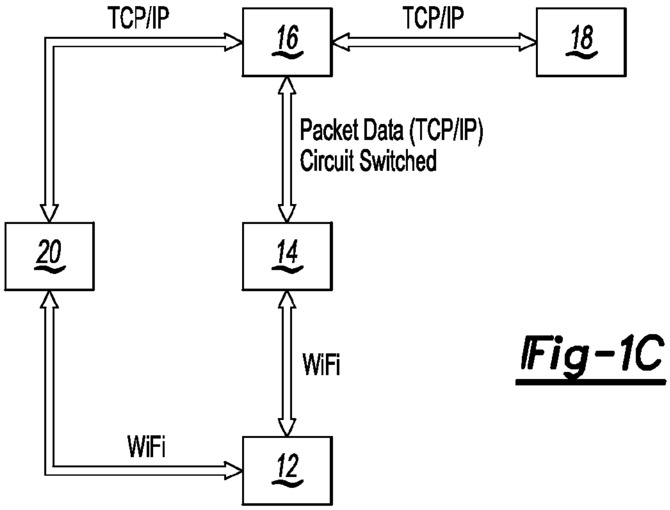

In the example shown in FIG. 1C, the telematics service center 16 acts as a command/control center and hub/gateway to manage the communications between the entities 12, 14, 16, 18. In this example, the telematics service center 16 services the requests of the other connected entities, or passes upon requests to be serviced by the other entities. In this example, the application 12 connects with the telematics unit 14 via a Wi-Fi™ connection, and with the dealer 20 via a Wi-Fi™ connection. The telematics service center 16 and the telematics unit 14 are connected via a packet data session (i.e., a TCP/IP connection) or a circuit switched connection. The telematics service center 16 is also connected to the dealer 20 and the OEM 18 via respective TCP/IP connections.

Figure 1D:
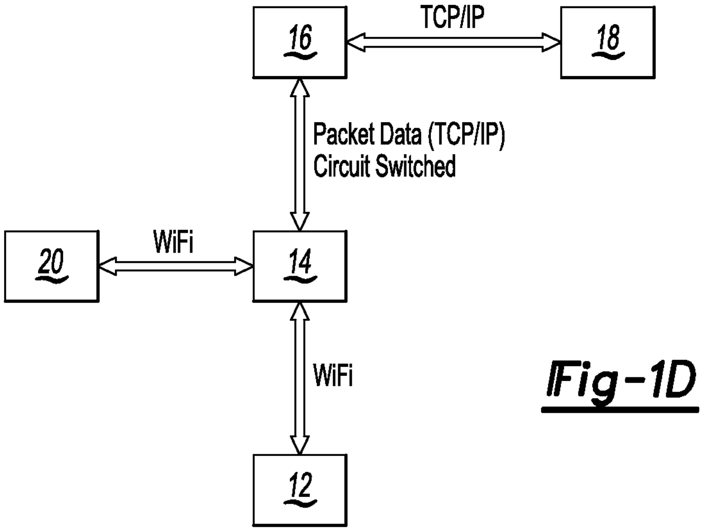

In the example shown in FIG. 1D, the telematics unit 14 acts as a command/control center and hub/gateway to manage the communications between the entities 12, 14, 16, 18. In this example, the telematics unit 14 services the requests of the other connected entities, or passes on requests to be serviced by the other entities. In this example, the application 12 connects with the telematics unit 14 via a Wi-Fi™ connection. The dealer 20 connects with the telematics unit 14 via a Wi-Fi™ connection. The telematics service center 16 connects to the telematics unit 14 via a packet data session (i.e., a TCP/IP connection) or a circuit switched connection. The OEM 18 connects to the TSC 16 via a TCP/IP connection, and connects to the telematics unit through the TSC 16.

Figure 1E:
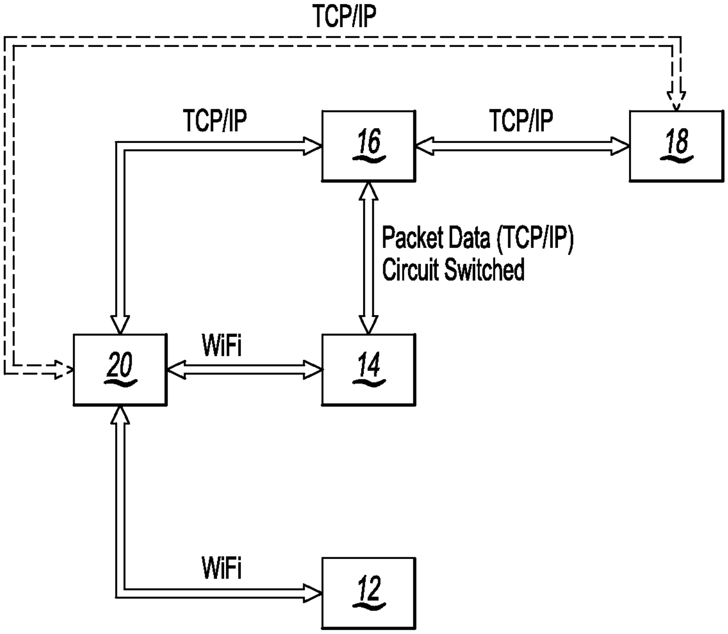

In the example shown in FIG. 1E, dealer 20 acts as a command/control center and hub/gateway to manage the communications between the entities 12, 14, 16, 18. This example may be utilized when a representative or employee of the dealer 20 is utilizing the application 12. The dealer 20 version of the application 12 may include a screen that enables the user to view vehicles enrolled at the dealership and view information relating to the status of a newly purchased vehicle. For example, the dealer 20 may be requested by a customer, who has purchased a new vehicle, to set up the telematics unit 14 and a user account with the telematics service center 16. Once these tasks have been completed, the application 12 may inform the dealer 20 that the vehicle is ready to be launched with the application 12 that will be used by the user. As such, the dealer 20 and the customer may have different experiences when utilizing the application 12. In the example shown in FIG. 1E, the application 12 connects with the dealer 20 via a Wi-Fi™ connection. The dealer 20 connects to the telematics unit 14 via a Wi-Fi™ connection and to the telematics service center 16 via a TCP/IP connection. The TSC 16 connects to the telematics unit 14 via a packet data session (i.e., a TCP/IP connection) or a circuit switched connection. The dealer 20 may also connect to the OEM 18 via a TCP/IP connection, if such a connection is desirable.

It is to be understood that, in the examples disclosed herein, the connection(s) that are made between the various entities 12, 14, 16, 18 and/or 20 may depend, at least in part, upon the user of the application 12 and/or whether the application 12 or one of the entities 14, 16 is to be the communication command/control center and hub/gateway.

It is further to be understood that the application 12 may connect to the telematics unit 14 and/or to the dealer 20 using a standard other than Wi-Fi™. In an example, it is believed that the application 12 may connect with the telematics unit 14 and/or the dealer 20 using a BLUETOOTH® connection.

As briefly mentioned above, the application 12 may be utilized by the customer upon purchasing a new (or used) vehicle, but before the vehicle has been physically delivered to the customer by the dealer 20. This allows the customer to configure the vehicle according to his/her preferences, as well as learn about certain vehicle features, services, etc. before actually taking possession of the vehicle. The application 12 may also be accessible to the customer after the vehicle has been delivered e.g., to change preferences or settings, to obtain further instructional or educational information about the vehicle, and/or the like. It is further believed that the application 12, if used by customers, may advantageously reduce certain welcome and customer care calls to the telematics service center 16 upon purchasing the vehicle, reduce warranty costs, improve vehicle service retention, improve vehicle sales, etc.

The application 12, described in more detail below, is also adaptable to include additional languages so that the application may be used on a global scale. For example, the application 12 may support multiple languages, locales, and/or vehicle brands.

As shown in FIG. 1A, for example, the application 12 is downloaded to a mobile communications and processing device 10, such as a tablet computer as mentioned above. Other examples of communications and processing devices include stationary devices (such as desk top computers and/or the like) and handheld devices (such as smartphones, laptop computers, notebook computers, and/or the like). While the application 12 shown in FIG. 1A is an "app" that is resident on the device 10, it is to be understood (as mentioned above) that the application 12 may also be a website that is accessible via any of the devices 10 mentioned herein. It is to be understood that the application 12 is configured to recognize the type of device 10 upon which the application 12 resides or from which the application 12 is accessed, and will automatically optimize its usability based on the device type. For instance, if the application 12 is downloaded to a tablet computer or is accessed via a smartphone having a touchscreen, then the application 12 will optimize its usability to accommodate a touch screen user interface. If the application 12 is downloaded to or accessed from a laptop computer, on the other hand, then the application 12 will optimize its usability for a mouse click or keyboard user interface.

Further, the downloadable version of the application 12 may be downloaded from a server of a telematics service center 16, which is owned by a telematics service provider. This may be accomplished, e.g., by accessing a webpage owned and/or run by the telematics service provider, and downloading the application 12 to the device 10 from the webpage. The downloadable version of the application 12 may otherwise be downloaded from an application store, such as, e.g., iTunes®, the Android Marketplace, or the like.

Upon purchasing the vehicle (identified by 112 in FIG. 6), the customer may have already set up his/her account with the telematics service provider, e.g., through the ownership of another vehicle. If this is the case, then the customer may use his/her previously set login and password to register with and access the application 12 immediately. In instances where the customer does not already have an account with the telematics service provider, he/she may set up an account at the dealer 20 using the application 12 or the dealer's connection with OEM 18 or the telematics service center 16 (see, e.g., FIG. 1E). The customer sets up a login and password that may be used to access the application 12 upon setting up an account with the telematics service provider. Once the account is set up, the customer can access the application 12 using that login and password.

In instances where the customer has not already set up his/her account with the telematics service provider, the dealer may do so. Setting up an account may be accomplished using a telematics service provider online enrollment process. This allows the dealer to input information and/or select account access details to set up the account. Examples of information and/or account access details include selecting a username or login, selecting a password, selecting and answering one or more security questions, inputting an electronic mailing (e-mail) address, inputting an alternate e-mail address, selecting a personal identification number (PIN) associated with the account, selecting to agree with terms and conditions of the telematics service provider, inputting a zip code of the customer's garage address, and the like. Once the account has been set up, the dealer will receive an account number. The dealer 20 can then prompt the application 12 to access the new account to determine the customer's vehicle and if the vehicle is ready for delivery. It is to be understood, however, that the application 12 does not have a forgotten login and/or password retrieval process, and that the customer will have to contact the telematics service center 16 directly in order to obtain a new login and password if one or both is forgotten. Further, all of the information input by the customer while setting up his/her account is stored in the user profile at the service center 16; and is not stored locally on the device 10.

In instances where the customer has already set up his/her account with the telematics service provider, the customer or the dealer 20 may register this account with the application 12. In some instances, the account with the telematics service provider is created at the dealer 20, and registered with the application 12 at the dealer 20. Registering a previously set up an account may be accomplished by inputting various account related information into the application 12. In an example, the customer may have to provide his/her account username or login, his/her account password, his/her answers to one or more security questions, any e-mail address(es) associated with the account, his/her account personal identification number (PIN), selecting to agree with terms and conditions of the telematics service provider, his/her account number, and the zip code associated with the account. Once the previously existing account has been registered, the customer may access the account, through the application 12, by submitting the customer-selected username and password. Since an existing account is associated with a particular vehicle 112, upon registering this account, the application 12 will know which vehicle 112 to communicate with.

It is to be understood that the customer may skip the account creation or registration process, e.g., by not selecting the new account icon presented on the welcome screen. Skipping creation or registration may be desirable when the customer already has an account set up with the telematics service provider that has been registered with the application 12. In this case, the customer will login to an existing account by submitting a preset login and password into the welcome screen of the application 12. The customer may also be able to logout of the application 12 by selecting (e.g., touching, clicking, etc.) a logout icon presented somewhere on the application display screen. In some cases, the application 12 may be configured for automatic logout after a period of time of inactivity (e.g., after 10 minutes of inactivity, after 15 minutes of inactivity, or the like).

When registering a telematics service provider account number with the application 12, the application 12 will automatically present to the customer all of the vehicles 112 associated with that account number that are ready and able to communicate with the application 12. In this example, the customer may choose which vehicle(s) 112 he/she would like to link to the application 12. If a user's vehicles 112 are associated with different telematics service provider accounts, the customer would have to register each account separately with the application 12 in order to address those particular vehicles 112.

The vehicle 112 has to be configured in order to communicate with the application 12. The application 12 may determine if the vehicle 112 is ready when a customer attempts to utilize the application 12, or when the dealer 20 prompts the application 12. If a customer attempts to log into the application 12 at the dealer 20, vehicle 112 information will automatically be passed to the application 12. If the customer attempts to log into the application 12 outside of the dealer 20, he/she may be asked to provide his/her login and password. Once identifying the vehicle 112, the application 12 will attempt to communicate with the vehicle 112, and if the vehicle 112 is not properly configured, the application 12 will deny the customer access to the application 12 indicating, for example, that a connection cannot be made with the vehicle 112. If the vehicle 112 is properly configured, the application 12 will connect with the telematics unit 14 of the vehicle 112 and the user may gain access to the application 12.

Once the application 12 is accessed, the device 10 automatically establishes direct or indirect wireless (short range or Internet) connections with four entities: the telematics unit 14 of the vehicle 112 being/having been purchased by the customer, the telematics service center 16 which is owned by the telematics service provider, an information system of the OEM 18, and an information system of a dealer 20 associated with the OEM.

It is to be understood that the customer is automatically given authorization to access the application 12 by satisfying the criteria that i) he/she has an account with the telematics service provider and ii) has purchased or is then-currently purchasing a vehicle having a telematics unit 14 configured to make the various connections. When authorized, the customer has permission to access to all portions of the application 12, assuming the vehicle 112 and its various systems are capable of connecting and responding to the application 12 (e.g., the radio presets, remote settings, etc. are capable of remote configuring). Examples of the various portions of the application 12 that the customer may access, as well as the actions/functions that the customer may perform while using the application 12 will be described in detail below in conjunction with FIGS. 2 through 5.

In an example, an unauthorized person or entity may have some access to the application 12; i.e., has permission to access only certain parts/aspects of the application 12. For instance, the unauthorized person/entity may be allowed to obtain content specific to the vehicle 112, such as instruction information for how to use a particular vehicle system. In other instances, an unauthorized user attempting to access the application 12 may be provided with a video explaining the various aspects of the application 12 that may be available if he/she creates an account with the telematics service provider. The unauthorized person/entity may not, however, have access to vehicle functionality, and thus may not be able to access certain customer-selected vehicle settings, to make changes to those settings, customer account information, and/or the like.

Further, a representative of the dealer 20 from which the vehicle 112 is being/has been purchased may also have access to the application 12, but such access is limited (when compared to a customer's access). As such, the dealer 20 version of the application 12 may be different than the customer's version of the application 12. More specifically, the application 12 may include computer readable code that is specific for the dealer 20. This computer readable code may enable personnel at the dealer 20 to perform a particular set of functions in accordance with a particular set of rules (e.g., to enter vehicle registration information, etc. as previously mentioned). The application 12 may also include computer readable code that is specific for the customer. This computer readable code may enable the customer to perform another set of functions in accordance with another particular set of rules, but these functions are particular for the customer (e.g., to tailor one or more vehicle systems, etc. as also previously mentioned).

In an example, the application 12 has a rules module (i.e., computer readable code) that is in communication with, and is responsive to the OEM information system (designated OEM system(s) from which designated information may be retrieved) and the dealer information system (e.g., designated dealership system(s) from which designated information, e.g., vehicle lists, may be retrieved). The rules module is programmed to selectively provide access to application-related information to the dealer 20 and/or the customer. The rules module defines application access rules for the dealer 20, where such rules outline the various dealer functions as described herein. The rules module also defines application access rules for the customer, where this set of rules outlines the various customer functions as described herein. The rules module may update the different sets of rules, for example, in response to information received from one or more of the outside systems.

The application 12 also includes a communications module (i.e., computer readable code) that enables the application 12 to wirelessly communicate utilizing the communications components of the device 10. The communications module may communicate via suitable communications equipment (such as a wireless modem, a cellular chipset, etc.) for selectively establishing wireless connections, either directly or indirectly, with, e.g., any of the four entities 14, 16, 18, and 20 mentioned above. It is to be understood that when a communication is established with the OEM information system, data transmissions between the device 10 and the system of the OEM 18 may occur. It is further to be understood that when a communication is established with the dealer information system, data transmissions between the device 10 and the dealer information system may occur.

The application 12 also includes a user-interface, which is computer readable code that allows a user to interact with the various screens, functions, etc. of the application 12. The device 10 user-interface may be utilized to access, navigate, operate, etc. the application 12.

In an example, the particular set of rules for the dealer 20 gives the dealer 20 permission to enter or register the customer's information at the time of purchasing the vehicle 112. Once the customer's information has been entered by the dealer 20, the customer version of the application 12 is ready to be launched by the dealer 20 for customer use. The dealer 20 also has permission to authenticate and view vehicle registration status, vehicle history, and expected time of completion of data processing for entered customer information. The dealer 20 may also use the application 12 to select customer information (e.g., upon receiving a notification that the customer information has been entered into the application 12). Once the user/customer is registered, the application 12 produces a registration record, which may be viewable by the dealer representative.

As previously mentioned, in an example, the customer may access the application 12 at the dealer 20 using the customer's mobile device 10 (e.g., when the application 12 is downloaded by the customer to his/her device 10) or the dealer's device(s) 10. Either way, the customer is able to completely configure his/her vehicle 112 before taking possession of the vehicle 112 (i.e., before delivery of the vehicle 112 to the customer). It is envisioned that when the customer uses the device 10 at the dealership, the dealership salesman may accompany the customer while he/she uses the application 12 in order to assist the customer while he/she configures his/her vehicle 112.

If the device 10 is owned by the customer, then the customer may access the application 12 anywhere and at any time, such as before delivery of the vehicle 112 (e.g., to configure the vehicle 112) and after delivery of the vehicle 112 (e.g., to update and/or change preferences, settings, etc.). Examples of how the application 12 may be used, by the customer, to configure the vehicle 112 and/or make changes to preferences, etc. are described below. Further, any information input into the application 12 by the customer may be automatically sent to the telematics service center 16, where such information may be stored, e.g., in a user profile in one of the databases 172 (shown in FIG. 6). This information may be accessed, e.g., by the customer, an advisor 162, 162' at the service center 16, or by some other authorized person/entity, e.g., to provide services to the vehicle 112, etc.

Examples of features of the application 12 that require either a direct or indirect connection with any of the four entities identified above (i.e., 14, 16, 18, 20) will now be described herein in conjunction with FIGS. 2-5. It is to be understood that the any content that is presented to the customer while using the application 12 may be presented based on default settings. The presentation of the content may also be personalized based, at least in part, on information retrieved from the user's account or profile registered with the application 12 and stored at the service center 16. Personalization of the presentation of the content may also be based, at least in part, on data captured from vehicle identification records. Personalization may include addressing the customer by his/her first name on the screen and by showing a picture of the customer's vehicle 112.

The application 12 is also generally configured to allow the customer to navigate through the various screens of the application, and to obtain and/or change various information/content as desired as the customer moves from screen to screen. In one example, the screens of the application 12 are presented to the customer in sequence, and the customer can move through each screen by selecting (e.g., via a touch) a "Next" icon at the bottom of each screen. The customer may be able to revisit a previous screen by selected a "Back" icon. In another example, the customer may select the screens he/she wishes to visit by selecting such screens from, e.g., a drop down menu, an icon representing the desired screen, or the like. The application 12 is also configured to maintain a completion status as the customer moves through each screen. This completion status is measured relative to full completion of the application 12. In an example, the application 12 may present, to the customer, a status bar that is highlighted to show the customer's progress moving through the screens, a calculated percentage of the screens that have been completed, and/or the like. In this way, the customer is apprised of where he/she is at during his/her use of the application 12.

The application 12 may also include a loading screen as pages (i.e., screens) are loaded within the application 12. The loading screen may be useful in instances when the loading of an individual page or screen is slower than it would have been during normal operation (e.g., when wireless traffic is high).

Examples of features of the application 12 that require a connection between the device 10 and the telematics service center 16 (e.g., through the telematics unit 14 of the vehicle 112) will now be described herein in conjunction with FIG. 2. It is to be understood that any information that is provided to the user (e.g., the customer, an unauthorized person, etc.) is shown by an arrow pointing away from the device 10, whereas any information input into the application 12 by the customer is shown by an arrow pointing toward the device 10. Further, when information is provided to the user, the information is obtained by the device 10 from the telematics service center 16, which retrieves the information from various departments/divisions of the service center 16 and/or from one or more databases 172 (shown in FIG. 6). In an example, the database(s) 172 may store a user account and/or profile 220 and vehicle identification (ID) records 222. An example of a department/division 224 includes one that offers telematics services to the user, and another example of a department/division 226 includes one that can provide information about or address issues pertaining to connectivity with a telematics unit 14 in the vehicle 112, with connecting a mobile device (e.g., a cellular phone) with the telematics unit 14, and/or the like. It is to be understood that the service center 16 may include other departments and/or divisions that are designed to perform a number of other tasks of the service center 16. For example, one department/division may be specific for handling navigation services, while another department/division may be specific for handling emergency services.

Via the connection with the telematics service center 16, as an authorized person, the customer may have access to a verification screen, where the customer can view and verify his/her personal account information. This is shown at 200 in FIG. 2. Through the verification screen, the customer may also be able to update his/her personal account information.

In an example, the application 12 may be used, by the customer, to purchase services available from the telematics service center 16. The application 12 may present, to the customer, a list of services that are available for the customer's vehicle 112, and displays educational content (e.g., a description) for each service. This is shown at 202 in FIG. 2. The customer may use this information to learn more about each service so that he/she can decide which services (if any) he/she would like to purchase. The customer may also use the application 12 to purchase one or more services, and this as shown at 206 in FIG. 2. It is to be understood that the services provided to the customer through the application 12 are all of the services that are then-currently available (e.g., are compatible) for the customer's vehicle 112. The application 12 can determine which services are available for a particular vehicle 112 based upon information it gathers from the vehicle identification number (VIN) and the regular production option (RPO) code. Via its connection with the telematics service center 16, the application 12 can also provide new services as those new services become available. When the customer has purchased a service, the application 12 will also provide a confirmation notice of the purchase to the customer on the screen of the device 10. The application 12 may also be configured to send an e-mail message, a text message, etc. to the customer verifying his/her purchase(s).

It is to be understood that only the customer has authorization to purchase services from the telematics service center 16 via the application 12. An unauthorized person, such as a sales representative at the dealer 20 or a non-owner of the purchased vehicle, does not have authority to perform such purchasing, even on behalf of the customer.

In an example, during the purchasing of services from the telematics service center 16, the application 12 may provide a shopping cart so that the customer can browse through the different services and tentatively select those services that he/she may want to purchase. Selection of a service may involve touching or clicking on an icon to place a particular service into the shopping cart. When the customer does so, a new icon representing the desired service will be shown in the customer's shopping cart on another screen. The shopping cart screen is accessible to the customer for viewing by selecting the shopping cart icon on the screen. Further, the shopping cart screen may provide a status of all shopping cart transactions, as well as check out options for a then-current shopping cart selection. The shopping cart screen also provides a summary of the customer's current selections, and an option to remove one or more items from the cart. Via a purchase functionality, which may be presented as a check out icon, menu option, or the like, the customer can submit his/her order and thus proceed with purchasing the selected services in his/her shopping cart. It is to be understood that shopping cart selections are automatically removed when the browser is closed, the customer logs out of the application 12, and/or the application 12 logs the customer out after a period of inactivity.

The application 12 may also be used by anyone (e.g., authorized or unauthorized persons) to view instructional or educational material about various mobile applications that are available for download, for example, to the user's smartphone. In some instances, the application 12 also provides a link to online stores from which the mobile applications may be downloaded. The application 12 may also provide the customer with the option of sending an email with the link to an online store to download the mobile application(s). Examples of mobile applications that may be advertised by or promoted by the application 12 include telematics service provider applications (e.g., RemoteLink by Onstar which provides vehicle information, remote vehicle diagnostic functionality, remote command functionality, navigation functionality, call center contact information, roadside assistance information, etc.), vehicle brand specific applications, etc.

Authorized persons (e.g., the customer) may receive instructional or educational material pertaining to how to configure the telematics unit 14 of his/her vehicle for connectivity with the telematics service center 16 and/or how to configure the telematics unit 14 for connectivity with, e.g., the customer's mobile communications device (e.g., a smartphone). This is shown at 208 in FIG. 2.

Figure 9:
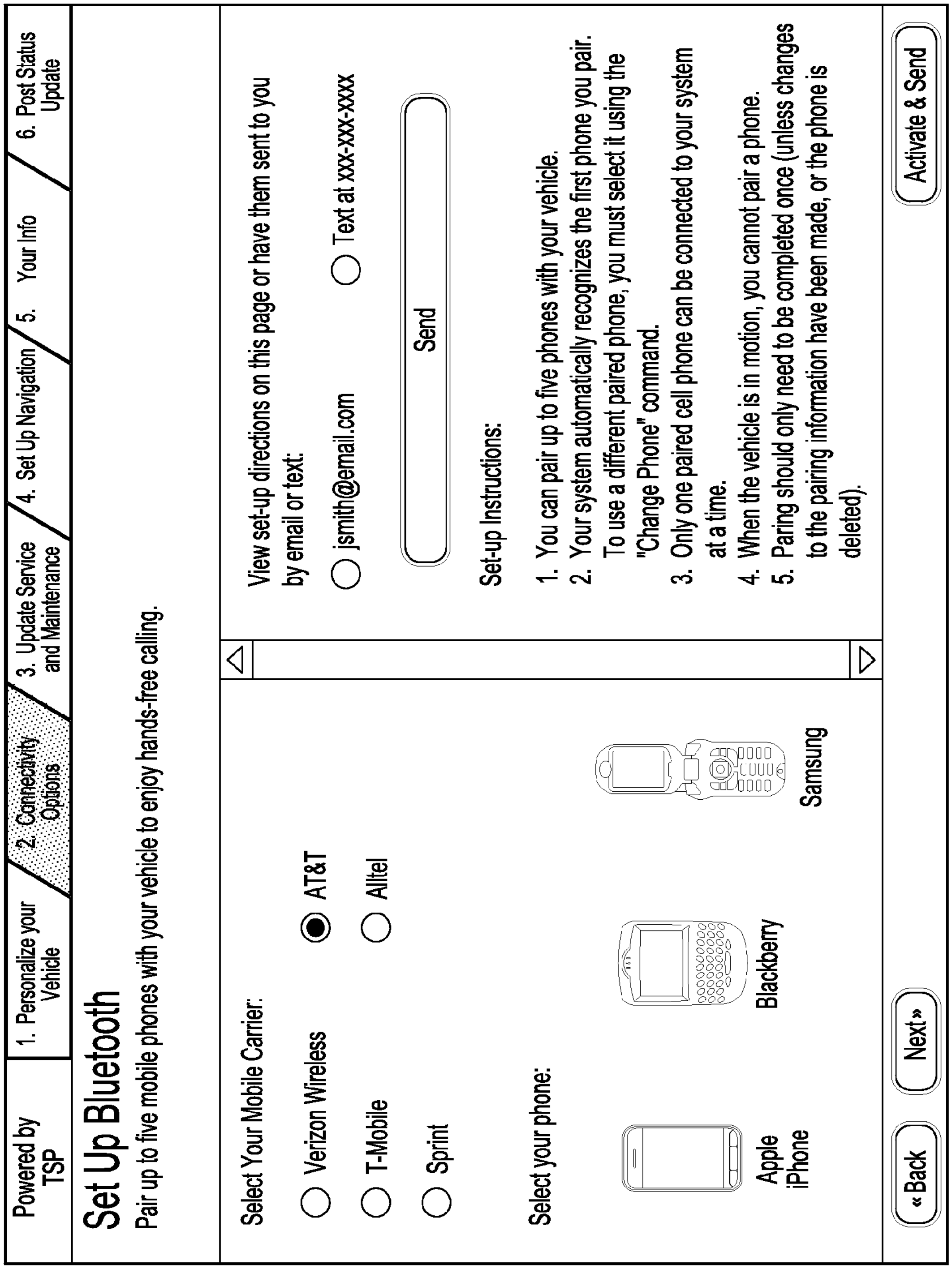

Beyond viewing the educational material, the customer may also use the application 12 to configure his/her mobile device so that the device may be operated inside the vehicle 112. In an example, the customer may configure his/her mobile phone to establish BLUETOOTH® connections with the telematics unit 14 so that the customer can use his/her mobile device inside the vehicle 112. As shown in a screen shot in FIG. 9, the customer may select his/her mobile carrier, and the type of mobile device that he/she is using. The same screen shot also provides instructional material for how to set up his/her device inside the vehicle 112 so that the device will establish BLUETOOTH® connections with the telematics unit 14. These instructions may be provided on the screen, as stated above, and/or may be sent to the customer via e-mail, for instance.

In an example, the customer (as an authorized person) may be able to obtain educational material and/or interact with calling services of the telematics service provider, such as hands-free calling services. The customer may be able to view content pertaining to the benefit of using hands-free calling through the telematics unit 14 compared to voice calls made through the short range wireless connections (e.g., BLUETOOTH® connections) established between the telematics unit 14 and the customer's mobile device. The customer may subscribe for hands-free calling services, such as a monthly plan, and/or may view or purchase any available hands-free calling bundles. The application 12 may also be used to view the customer's hands-free calling number and/or to have the hands-free calling number texted or e-mailed to the customer.

Figure 10:
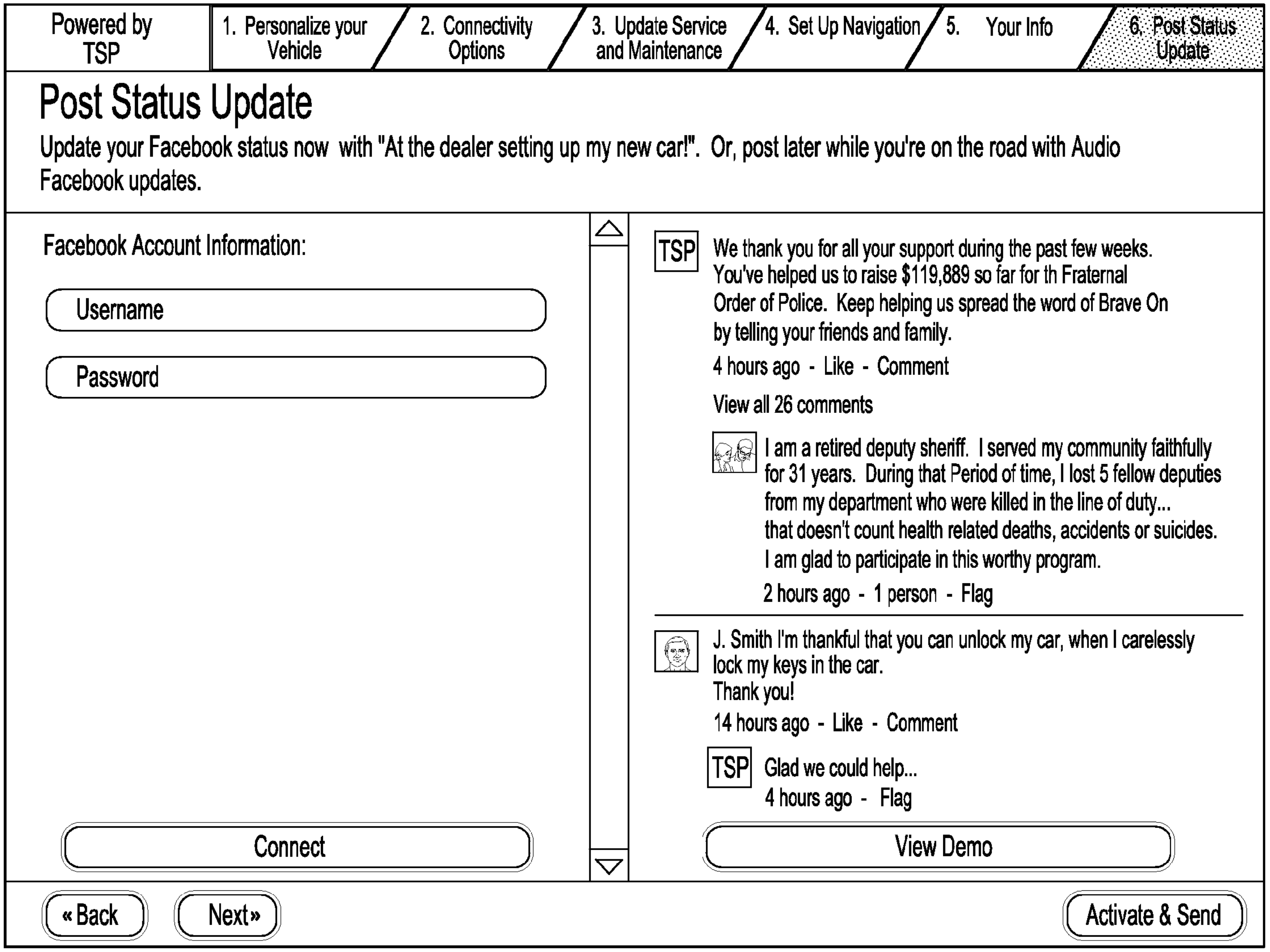

The application 12 may further be configured to enable an authorized user to login into his/her online networking page 194 (shown in FIG. 6) such as, e.g., a Facebook™ page, and to post any user-created, telematics service provider-created, or OEM-created messages. This is shown at 210 of FIG. 2. An example of a post uploaded by the customer may be a notification to the customer's networking group (i.e., friends of the customer's networking page 194) that the customer has just purchased a new vehicle. An example of a post uploaded by the telematics service center 16 may be a "thank you" message for signing up for telematics services. A screen shot of the application 12 that the customer may use to post message onto his/her Facebook™ page is shown in FIG. 10. This screen shot depicts a welcome screen where the customer can log into his/her Facebook™ page by submitting an appropriate username and password. The screen shot also depicts an example of a blog that may be shown on the networking page once the customer has logged into his/her Facebook™ account. The blog shown in FIG. 10 is a demo blog that can demonstrate to the customer how the application 12 may be used for social networking.

Figure 2:
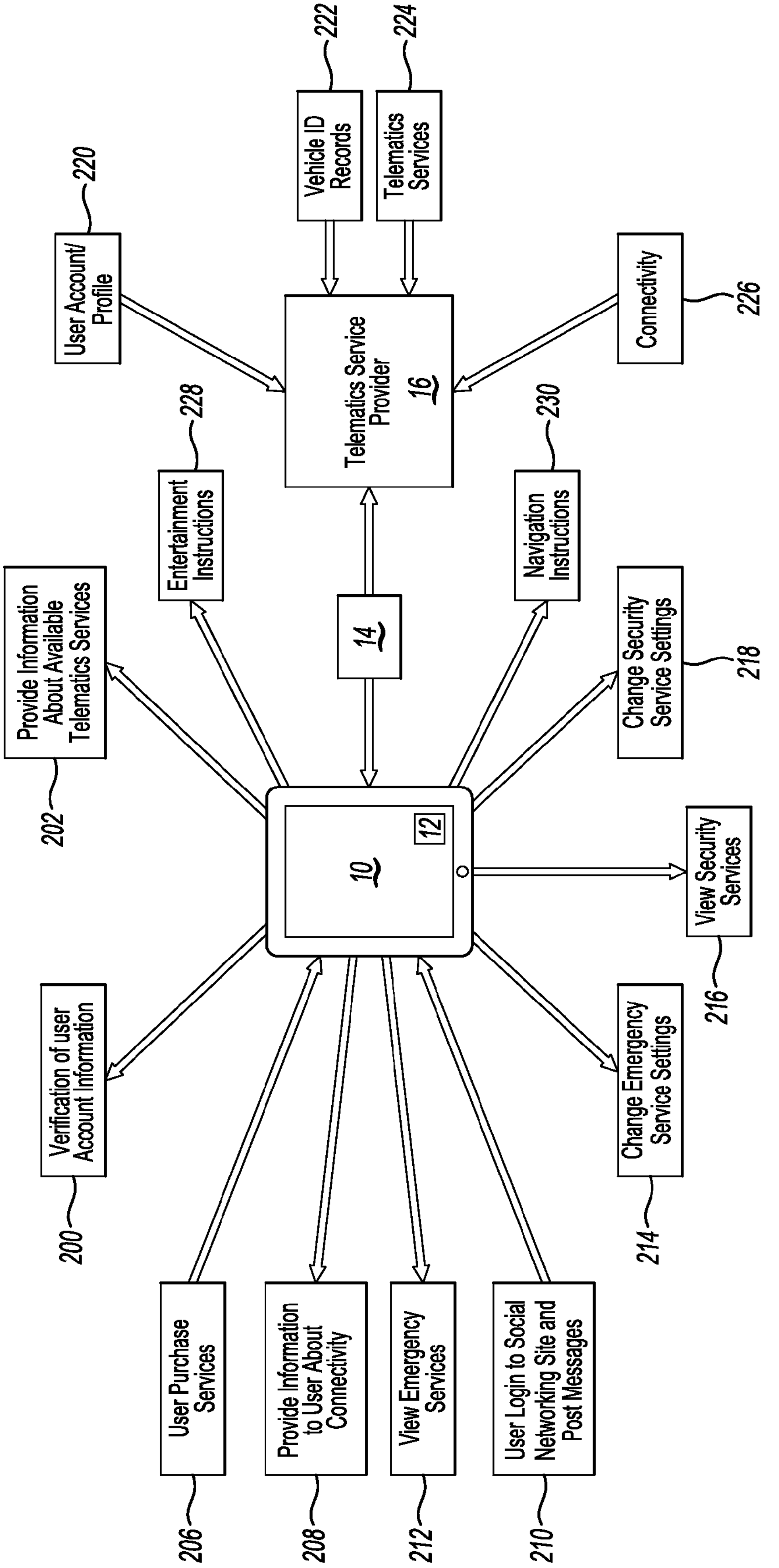
FIG. 2 is a schematic diagram of a portion of the diagram of FIG. 1A illustrating communication between the communications and processing device having the application resident thereon and a telematics service provider.

Other features of the application 12 that are accessible to authorized and unauthorized persons include information pertaining to emergency services offered by the telematics service center 16 (shown at 212 in FIG. 2). Such information may include the type of emergency services offered by the telematics service center 16, such as road side assistance, emergency calling number(s), etc. However, for authorized persons, the application 12 may enable the authorized person to change or edit his/her emergency contact details, such as emergency contact names, emergency contact dialing numbers, certain medical conditions of the customer, any allergies to certain medications, etc. This is shown at 214 in FIG. 2.

Yet further, the application 12 may be used, by authorized and unauthorized persons to obtain educational information pertaining to security services offered by the telematics service center 16. An example of a security service includes a stolen vehicle assistance service. This is shown at 216 in FIG. 2. Authorized persons, however, may utilize the application 12 to enter or edit information useful for vehicle security, such as a license plate number and insurance policy information. This is shown at 218 in FIG. 2.

The application 12 may also provide authorized users with navigation services (230 in FIG. 2) and/or product enhancements/add ons (228 in FIG. 2). For example, the customer may obtain educational information from the telematics service center 16 regarding vehicle navigation hardware capabilities (such as eNav, Turn-by-Turn directions and other service center 16 navigation download services). The customer may also obtain educational information, from the service center 16, for how to enter and save their home address or destination, and to allow customers to route to a particular destination. The connection with the telematics unit 14 enables the customer to preset particular addresses into the in-vehicle navigation unit, and or preset routes to particular destinations from those addresses. The customer may also be able to personalize infotainment settings of his/her vehicle 112, and may do so via the application 12 through connections established between the device 10 and the telematics service center 16 (e.g., to obtain educational content for the in-vehicle radio, to download/purchase applications for the radio, etc.) and the telematics unit 14 of the vehicle (e.g., to configure the radio with radio presets, music playlists, etc.).

Examples of features of the application 12 that require a connection between the mobile device 10 and the telematics unit 14 will now be described in conjunction with FIG. 3. Through this connection, in some instances, information (e.g., vehicle data retrieved from one or more vehicle systems) may be obtained by the device 10 from the telematics unit 14, e.g., so that the application 12 can perform some vehicle diagnostics on the vehicle that is being/has been purchased by the customer. A brief report summarizing the vehicle diagnostics analysis may be provided to the user, and the user may utilize the report to gain an understanding of the current status of his/her vehicle 112. In other instances, the user may input information into the application 12, which may utilize the information to configure one or more vehicle systems (shown by 308 in FIG. 3) according to user-selected preferences. The configuration of one or more vehicle systems 308 may be accomplished, e.g., by transmitting the customer-input information to the telematics unit 14, which configures the pertinent vehicle systems (based on the customer-input information) via command over a vehicle bus 134 (shown and described in conjunction with FIG. 6 below).

In an example, authorized persons may use the application 12 to initiate a brief vehicle diagnostics analysis, which utilizes, e.g., a then-current mileage, oil life, and tire pressure of the vehicle 112. This information may be obtained from the telematics unit 14, which retrieves the information from the appropriate vehicle systems 308. More specifically, the vehicle data (i.e., the mileage, oil life, etc.) is transmitted from the appropriate vehicle system 308 to the telematics unit 14 via a vehicle bus 134. Other information that may be used for the brief diagnostics analysis may be obtained from vehicle history information 310 stored in a memory 138 (also shown in FIG. 6) operatively associated with the telematics unit 14. The brief vehicle diagnostics analysis may be summarized, by the application 12, into the report, as mentioned above, and this report is viewable by authorized persons, as shown at 300 in FIG. 3. Authorized persons (e.g., the customer) alone may select to have a full vehicle diagnostics report generated based, at least in part, on the information contained in the brief vehicle diagnostics report.

Figure 3:
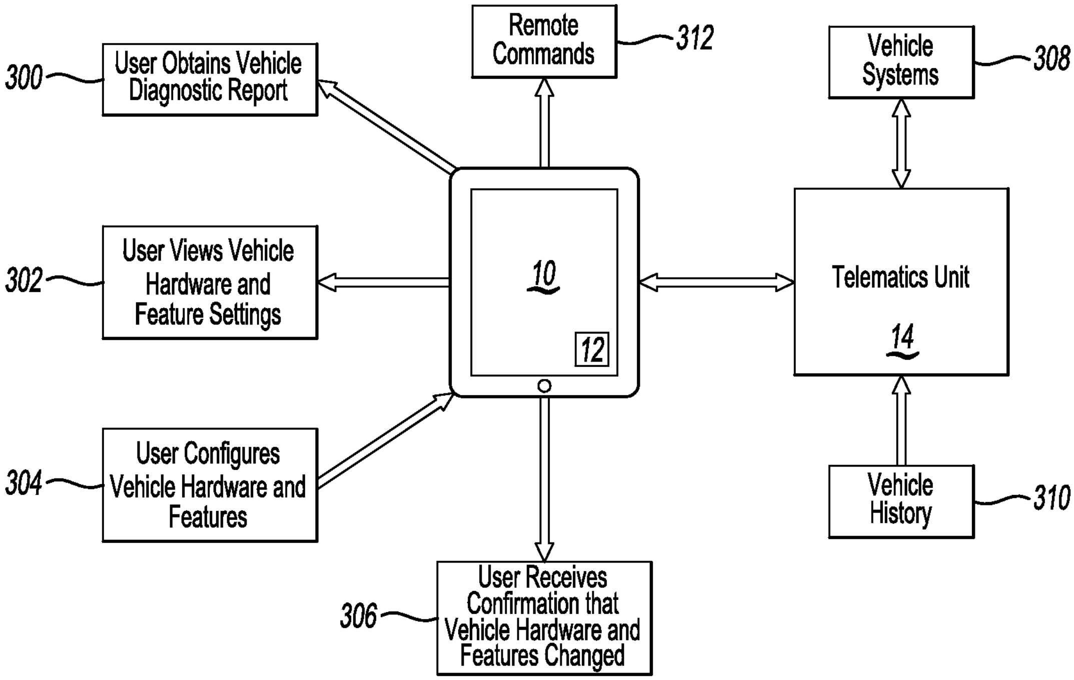
FIG. 3 is a schematic diagram of a portion of the diagram of FIG. 1A illustrating communication between the communications and processing device having the application resident thereon and a telematics unit operatively disposed in a vehicle.

The application 12 may also include a feature that allows the customer to view the then-current settings of vehicle hardware and features, as shown at 302 in FIG. 3, as well as educational material specific to those vehicle hardware and features. From the educational material, the customer may be able to personalize his/her vehicle 112 by configuring various vehicle settings that utilize the vehicle hardware and features. This is shown at 304 in FIG. 3. Examples of the vehicle settings include driver seat position, door locking/unlocking feature, vehicle lighting features, vehicle HVAC settings, vehicle engine performance settings, etc. Upon making his/her selections, the customer's personalized settings are transmitted from the device 10 to the telematics unit 14, and the settings are implemented by the appropriate vehicle systems 308 on command by the telematics unit 14. In some cases, the application 12 will generate a confirmation notice for the customer when the device 10 receives a notification message of the same from the telematics unit 14. This is shown at 306 in FIG. 3.

Figure 8:
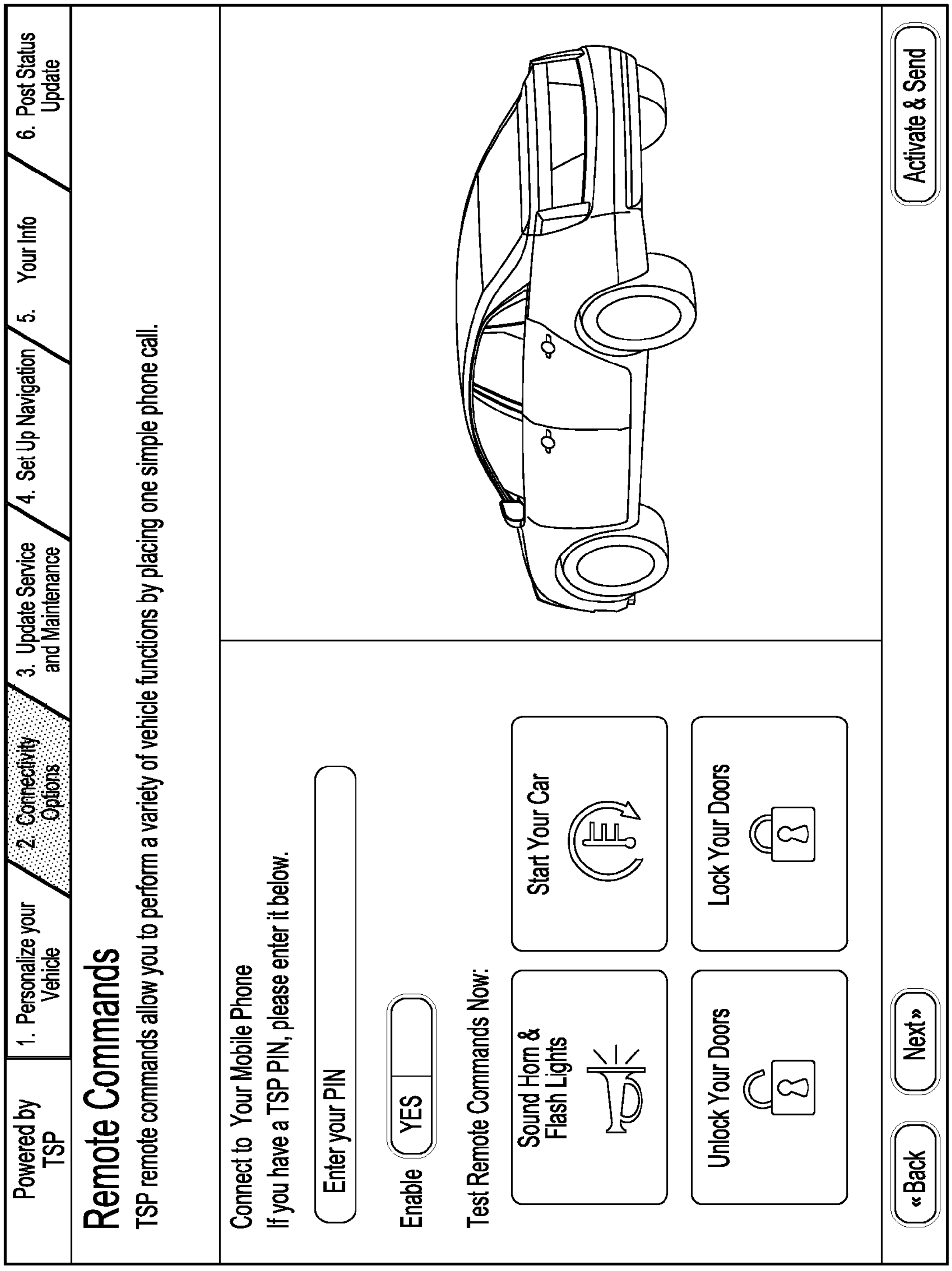

When the application 12 is connected to the telematics unit 14 and the vehicle 112 is capable of responding to remote commands, the customer may utilize the application 12 to test the remote commands. This is shown at 312 of FIG. 3. One screen shot of the application 12 is shown in FIG. 8, and this screen shot depicts icons representing various telematics unit functions that are activatable by remote command, and upon selecting an icon, the customer may test or demonstrate the function. The functions that the customer may test/demonstrate using this screen include a remote command to sound the vehicle horn and to flash vehicle lights, a remote command to power on (or start) the vehicle, a remote command to unlock vehicle doors, and a remote command to lock vehicle doors. As shown in FIG. 8, upon inputting an appropriate personal identification number (PIN), the customer can test/demonstrate each of the functions listed above by selecting (e.g., via a touch, mouse click, or the like) one of the icons representing the desired function.

Figure 4:
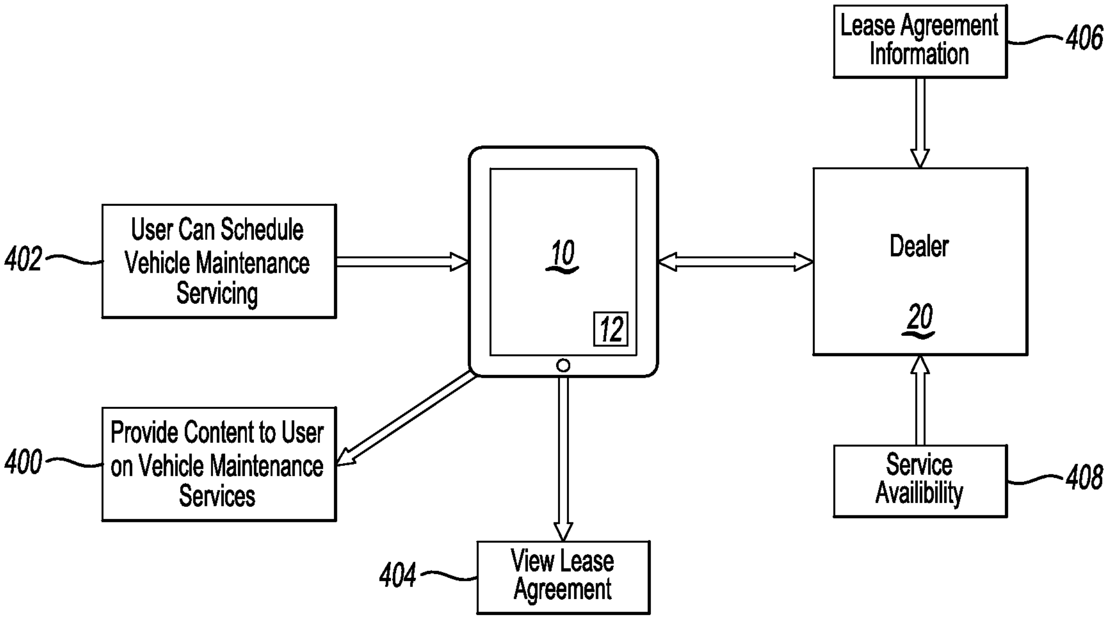
FIG. 4 is a schematic diagram of a portion of the diagram of FIG. 1A illustrating communication between the communications and processing device having the application resident thereon and a dealer associated with an original equipment manufacturer (OEM)

Examples of features of the application 12 that require a connection between the mobile device 10 and a dealer 20 associated with an OEM will now be described in conjunction with FIG. 4. The application 12 may include one or more screens dedicated to the vehicle dealer, such as for a dealer maintenance program where the customer may be able to obtain educational information pertaining to vehicle maintenance services available by the dealer 20 (400 in FIG. 4), as well as to sign up for the vehicle maintenance services. In an example, on one screen of the application 12, the customer may be able to schedule future vehicle maintenance service appointments with the dealer 20, as shown at 402 in FIG. 4. Scheduling of the service appointments may involve contacting the dealer 20, via the application 12 through the connection established between the device 10 and the dealer 20, and obtaining service availability (shown at 408) from the service department of the dealer 20. From such information, the customer can select dates and times for future vehicle maintenance service appointments and input those dates and times into an appropriate screen of the application 12. This information is transmitted directly to the information system of the OEM 18 to create service leads so that service appointments may be scheduled.

The connection between the device 10 and the dealer 20 may also be used, by the customer, to obtain lease agreement information (which is stored in a lease agreement database 406 at the dealer 20). This is shown at 404 in FIG. 4. Upon viewing the lease agreement information, the customer may also use the application 12 to make any changes to, or otherwise update his/her lease agreement.

Figure 5:
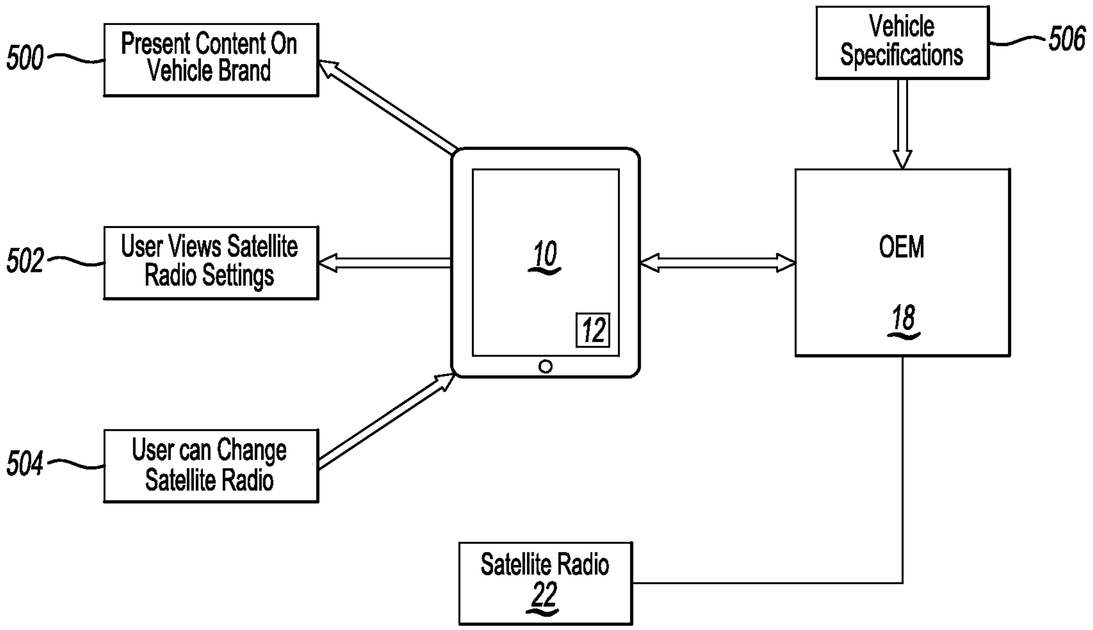
FIG. 5 is a schematic diagram of a portion of the diagram of FIG. 1A illustrating communication between the communications and processing device having the application resident thereon and an information system of the OEM.

Examples of features of the application 12 that require a connection between the mobile device 10 and an information system of the OEM (e.g., the OEM 18) will now be described in conjunction with FIG. 5. Via this connection, anyone (authorized or unauthorized) may be able to obtain, through the application 12, information about a particular vehicle brand, including vehicle brand style, logo, and imagery, as shown at 500 in FIG. 5. The vehicle brand information may be retrieved from the OEM 18 from a database 506 containing vehicle specifications based on brand. The application 12 may also be configured to customize the brand information provided to the customer based upon his/her past purchases (e.g., information is provided about one brand of an OEM as opposed to each brand of the OEM).

Figure 7:
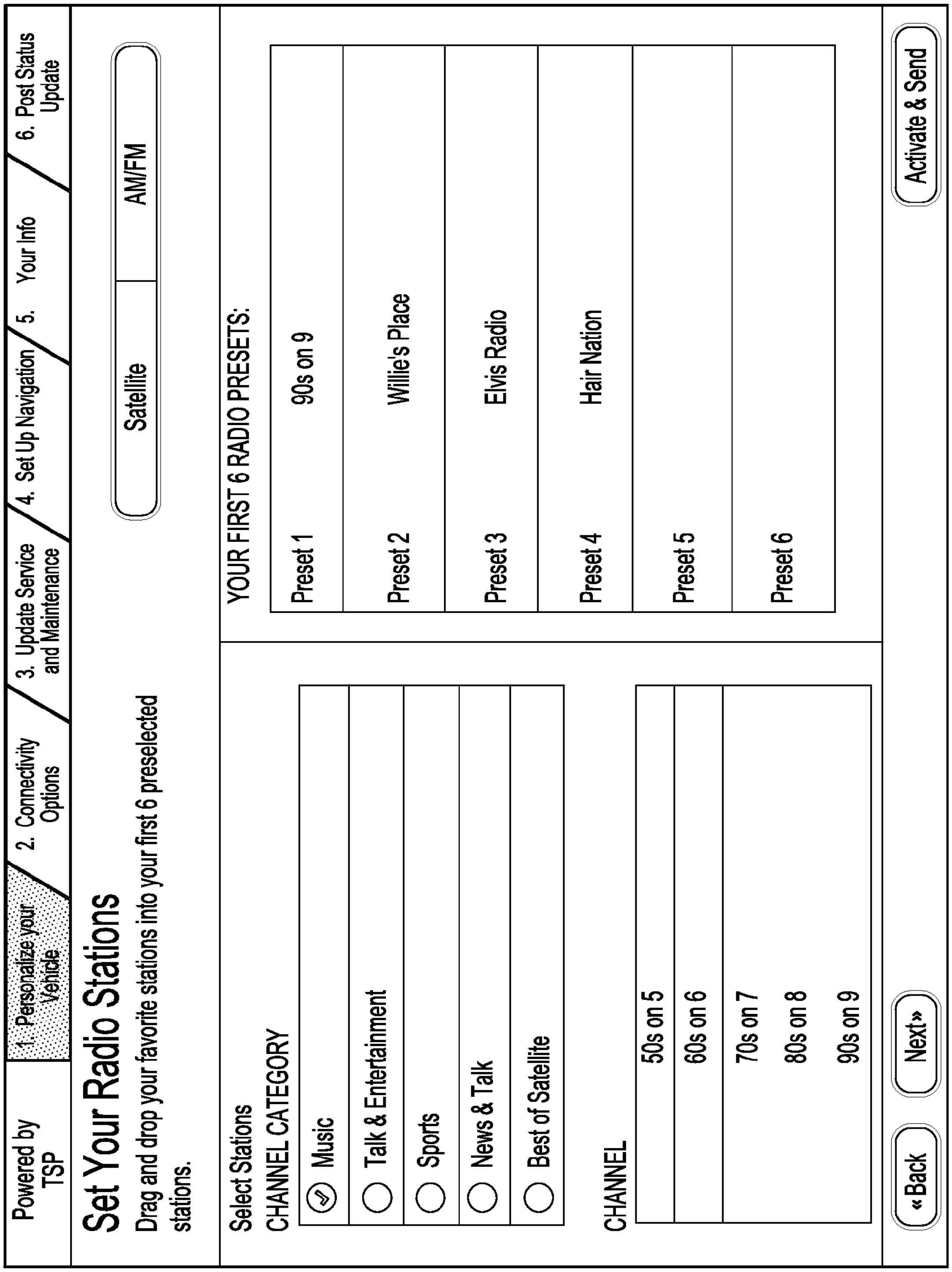
FIGS. 7-10 are screen shots of pages of an example of the application of the instant disclosure.

In an example, the device 10 may also be able to receive information about a satellite radio service provider 22 through its connection with the OEM 18 (shown in FIG. 5) or the telematics service provider (not shown). The satellite radio provider sends information to the OEM 18 or the telematics service provider, and the OEM 18 or the telematics service provider makes the information available via the application 12. An example of this portion of the application 12 is shown in FIG. 7, where a customer may be able to configure his/her radio presets based on XM radio settings. Through this screen, the customer can view, select, and organize particular FM and AM radio stations, as well as delete any FM and AM radio stations that he/she does not want. The customer can also view all of the satellite radio channels, as well as those that are considered to be most popular based on the vehicle make and mode. Particular satellite radio channels may be selected by the customer. After the radio settings have been set, the settings are sent from the application 12 to the telematics unit 14, which uploads them to the radio. The customer may also be able to view and confirm that the radio settings have been successfully set and transmitted to the vehicle 112. All of these features are shown at 502 and 504 in FIG. 5.

In an example, the application 12 may also include a screen that provides a summary page listing the completion status of the application 12 by the customer, as well as shopping cart status. The summary page may also provide directional messages for those screens of the application 12 that were not completed by the customer. In some instances, the application 12 may provide instructional information for the customer on how to complete the uncompleted screens.

An example of a vehicle onboarding system 100 that utilizes the application 12 resident on the device 10 will now be described herein in conjunction with FIG. 6.

The system 100 generally includes the vehicle 112 being/having been purchased by the customer, the telematics unit 14 operatively disposed in the vehicle 112, the carrier/communication system 116 (including, but not limited to, one or more cell towers 118, one or more base stations 119 and/or mobile switching centers (MSCs) 120, and one or more service providers (e.g., 190) including mobile network operator (s)), one or more land networks 122, and one or more telematics service/call centers 16.

In an example, the carrier/communication system 116 is a two-way radio frequency communication system, and may be configured with a web service supporting system-to-system communications (e.g., communications between the service center 16 and the service provider 190). The device 10 is at least in communication with the telematics unit 14 of the vehicle 112 and the telematics service center 16 via the carrier/communication system 116.

The carrier/communication system 116 also includes one or more host servers 192 including suitable computer equipment (not shown) upon which information of a website resides/is stored. As disclosed herein, the website may be the application 12 with which a remotely accessible page 194 (e.g., a webpage) is associated.

Figure 6:
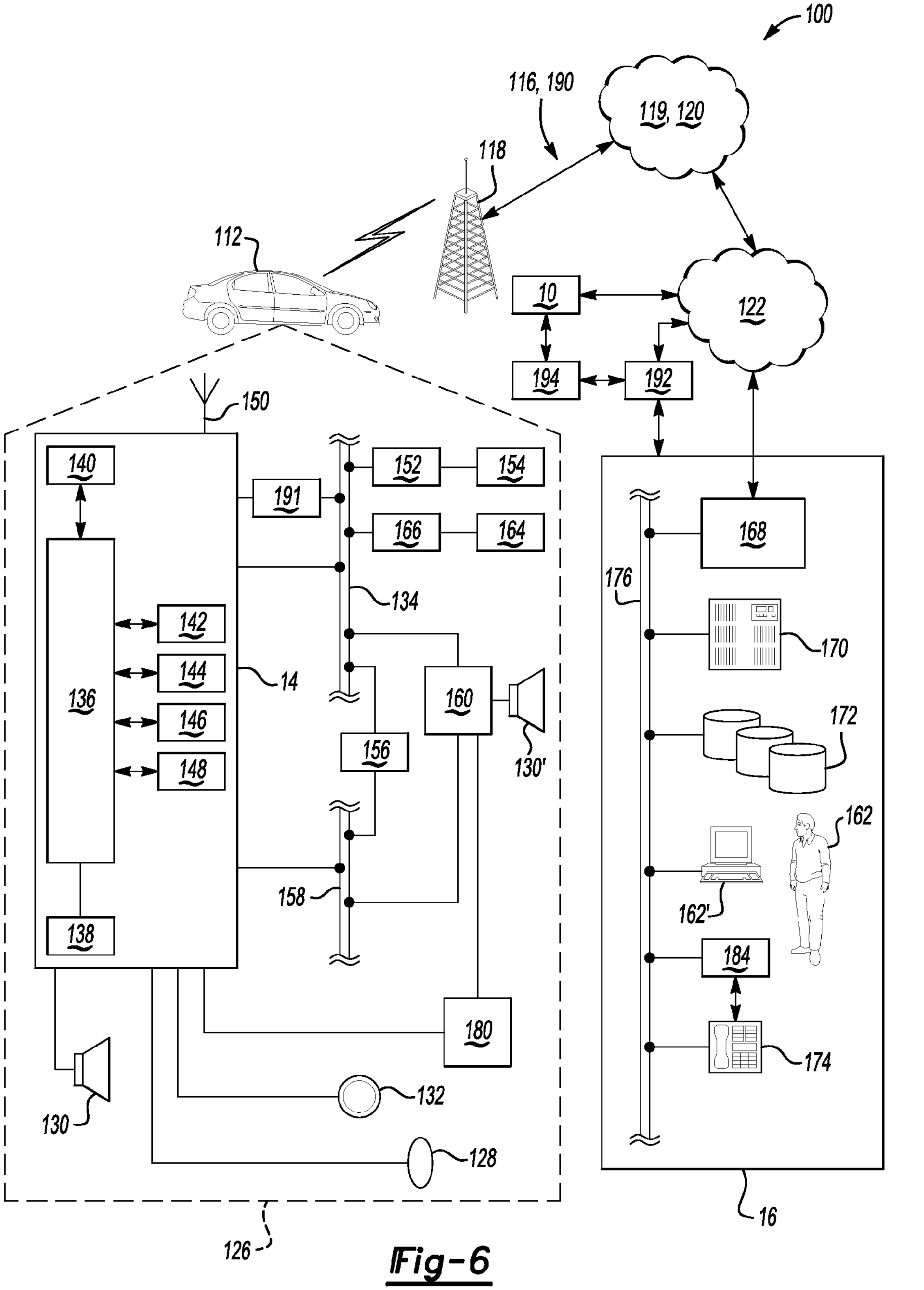
FIG. 6 is a schematic diagram depicting an example of a vehicle onboarding system.

The overall architecture, setup and operation, as well as many of the individual components of the system 100 shown in FIG. 6 are generally known in the art. Thus, the following paragraphs provide a brief overview of one example of the system 100. It is to be understood, however, that additional components and/or other systems not shown here could employ the method(s) disclosed herein.

Vehicle 112 may be a mobile vehicle, such as a motorcycle, car, truck, recreational vehicle (RV), boat, plane, or the like, and is equipped with suitable hardware and software that enables it to communicate (e.g., transmit and/or receive voice and data communications) over the carrier/communication system 116.

Some of the vehicle hardware 126 is shown generally in FIG. 6, including the telematics unit 14 and other components that are operatively connected to the telematics unit 14. Examples of other hardware 126 components include a microphone 128, speakers 130, 130', and buttons, knobs, switches, keyboards, and/or controls 132. Generally, these hardware 126 components enable a user to communicate with the telematics unit 14 and any other system 100 components in communication with the telematics unit 14. It is to be understood that the vehicle 112 may also include additional components suitable for use in, or in connection with, the telematics unit 14.

Operatively coupled to the telematics unit 14 is a network connection or vehicle bus 134, as previously mentioned. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 134 enables the vehicle 112 to send and receive signals from the telematics unit 14 to various units of equipment and systems both outside the vehicle 112 and within the vehicle 112 to perform various functions, such as unlocking a door, executing personal comfort settings, and/or the like. At least some of these functions may be performed remotely, utilizing the application 12.

The telematics unit 14 is an onboard vehicle dedicated communications device. In an example, the telematics unit 14 is linked to a telematics service center (e.g., a call center 16) via the carrier system 116 utilizing a packet data session or a circuit switched connection, and is capable of calling and transmitting data to the call center 16.

The telematics unit 14 provides a variety of services, both individually and through its communication with the call center 16. The telematics unit 14 generally includes an electronic processing device 136 operatively coupled to one or more types of electronic memory 138, a cellular chipset/component 140, a wireless modem 142, a navigation unit containing a location detection (e.g., global positioning system (GPS)) chipset/component 144, a real-time clock (RTC) 146, a short-range wireless communication network 48 (e.g., a BLUETOOTH® unit), a dual antenna 150. In an example, the telematics unit 14 further includes a short range wireless antenna 151 for establishing short range wireless connections with mobile devices, such as the customer's cellular phone when the phone is inside the vehicle 112. In one example, the wireless modem 142 includes a computer program and/or set of software routines (i.e., computer readable instructions embedded on a non-transitory, tangible medium) executed by the processing device 136.

It is to be understood that the telematics unit 14 may be implemented without one or more of the above listed components (e.g., the real time clock 146), except in some examples disclosed herein, the telematics unit 14 includes the short range wireless network 148. It is to be further understood that telematics unit 14 may also include additional components and functionality as desired for a particular end use.

The electronic processing device 136 of the telematics unit 14 may be a micro controller, a controller, a microprocessor, a host processor, and/or a vehicle communications processor. In another example, electronic processing device 136 may be an application specific integrated circuit (ASIC). Alternatively, electronic processing device 136 may be a processor working in conjunction with a central processing unit (CPU) performing the function of a general-purpose processor. The electronic processing device 136 (also referred to herein as a processor) may, for example, include software programs having computer readable code to initiate and/or perform various functions of the telematics unit 14.

In an example, the processor 136 may generate commands to be sent to various vehicle systems via the vehicle bus 134 to obtain vehicle data from those systems (e.g., in response to a diagnostics request sent from the application 12). The telematics unit 14 may then transmit this vehicle data to the device 10 as previously mentioned. The transmission of the vehicle data from the telematics unit 14 to the device 10 may occur during a vehicle data upload (VDU) event, which may be initiated in response to a trigger. The trigger may, e.g., the receipt of a request to send such data to the device 10 that that the vehicle diagnostics may be performed. The VDU event may occur, for instance, during a packet data session, where data in the form of packet data is transmitted over a packet-switch network (e.g., voice over Internet Protocol (VoIP), communication system 16, etc.). The telematics unit 14 includes a vehicle data upload (VDU) system 191 or is interfaced to the VDU system 191. As used herein, the VDU system 191 is configured to receive the vehicle data from various vehicle systems and/or from the memory 138 (in instances where the vehicle data is stored in the memory for later transmission of such data to, e.g., the device 10). The VDU system 191 then packetizes the data and places the data into a suitable format for uniform transmission to the device 10, and transmits the packetized data message to the device 10. In some cases, the vehicle data may already be packetized (e.g., the data may be stored in the memory 138 as packetized data), and in such instances, the VDU 191 will simply revise the format for uniform transmission of the data to the device 10. Revising the format may include, for example, re-packetizing the data for transmission over the connection that links the device 10 to the telematics unit 14 (which may require a different format than the format of the data stored in the memory 138). In one example, the VDU 91 is operatively connected to the processor 136 of the telematics unit 14, and thus is in communication at least with the device 10 via a BLUETOOTH® connection. In another example, the VDU 191 may be the telematics unit's central data system that can include its own modem, processor, and onboard database. The database can be implemented using a separate network attached storage (NAS) device or be located elsewhere, such as in the memory 138, as desired. The VDU 191 has an application program that handles the vehicle data upload processing, including communication with the device 10.

Still referring to FIG. 6, the location detection chipset/component 144 may include a Global Position System (GPS) receiver, a radio triangulation system, a dead reckoning position system, and/or combinations thereof. In particular, a GPS receiver provides accurate time and latitude and longitude coordinates of the vehicle 112 responsive to a GPS broadcast signal received from a GPS satellite constellation (not shown).

The cellular chipset/component 140 may be an analog, digital, dual-mode, dual-band, multi-mode and/or multi-band cellular phone. Basically, the cellular chipset 140 is a semiconductor engine that enables the telematics unit 14 to connect with other devices (e.g., other mobile communications devices) using some suitable type of wireless technology. The cellular chipset-component 140 uses one or more prescribed frequencies in the 800 MHz analog band or in the 800 MHz, 900 MHz, 1900 MHz and higher digital cellular bands. In some cases, the cellular chipset/component 140 may also use a frequency below 800 MHz, such as 700 MHz or lower. In yet other cases, the cellular chipset/component 140 may use a frequency above 2600 MHz. Any suitable protocol may be used, including digital transmission technologies, such as TDMA (time division multiple access), CDMA (code division multiple access), GSM (global system for mobile telecommunications), and LTE (long term evolution). In some instances, the protocol may be short range wireless communication technologies, such as BLUETOOTH®, dedicated short range communications (DSRC), or Wi-Fi™. In other instances, the protocol is Evolution Data Optimized (EVDO) Rev B (3G) or Long Term Evolution (LTE) (4G). In an example, the cellular chipset/component 140 may be used in addition to other components of the telematics unit 14 to establish communications between the vehicle 112 and another party.

Also associated with electronic processing device 136 is the previously mentioned real time clock (RTC) 146, which provides accurate date and time information to the telematics unit 14 hardware and software components that may require and/or request date and time information. In an example, the RTC 146 may provide date and time information periodically, such as, for example, every ten milliseconds.

The electronic memory 138 of the telematics unit 14 may be configured to store data associated with the various systems of the vehicle 112, vehicle operations, vehicle user preferences and/or personal information, and the like.

The telematics unit 14 provides numerous services alone or in conjunction with the call center 16, some of which may not be listed herein, and is configured to fulfill one or more user or subscriber requests. Several examples of these services include, but are not limited to: turn-by-turn directions and other navigation-related services provided in conjunction with the GPS based chipset/component 144; airbag deployment notification and other emergency or roadside assistance-related services provided in connection with various crash and or collision sensor interface modules 152 and sensors 154 located throughout the vehicle 112; and infotainment-related services where music, Web pages, movies, television programs, videogames and/or other content is downloaded by an infotainment center 156 operatively connected to the telematics unit 14 via vehicle bus 134 and audio bus 158. In one example, downloaded content is stored (e.g., in memory 138) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the call center 16, the telematics unit 14 is considered to be operating in a telematics service mode.

Vehicle communications generally utilize radio transmissions to establish a voice channel with carrier system 116 such that both voice and data transmissions may be sent and received over the voice channel. Vehicle communications are enabled via the cellular chipset/component 140 for voice communications and the wireless modem 142 for data transmission. In order to enable successful data transmission over the voice channel, wireless modem 142 applies some type of encoding or modulation to convert the digital data so that it can communicate through a vocoder or speech codec incorporated in the cellular chipset/component 140. It is to be understood that any suitable encoding or modulation technique that provides an acceptable data rate and bit error may be used with the examples disclosed herein. In one example, an Evolution Data Optimized (EVDO) Rev B (3G) system (which offers a data rate of about 14.7 Mbit/s) or a Long Term Evolution (LTE) (4G) system (which offers a data rate of up to about 1 Gbit/s) may be used. These systems permit the transmission of both voice and data simultaneously. Generally, dual mode antenna 150 services the location detection chipset/component 144 and the cellular chipset/component 140.

The microphone 128 provides the user with a means for inputting verbal or other auditory commands, and can be equipped with an embedded voice processing unit utilizing human/machine interface (HMI) technology known in the art. Conversely, speaker(s) 130, 130' provide verbal output to the vehicle occupants and can be either a stand-alone speaker 130 specifically dedicated for use with the telematics unit 14 or can be part of a vehicle audio component 160, such as speaker 130'. In either event and as previously mentioned, microphone 128 and speaker(s) 130, 130' enable vehicle hardware 126 and telematics service call center 16 to communicate with the occupants through audible speech. The vehicle hardware 126 also includes one or more buttons, knobs, switches, keyboards, and/or controls 132 for enabling a vehicle occupant to activate or engage one or more of the vehicle hardware components. In one example, one of the buttons 132 may be an electronic pushbutton used to initiate voice communication with the telematics service center 16 (whether it be a live advisor 162 or an automated call response system 162') to request services, to initiate a voice call to another mobile communications device, etc.

The audio component 160 is operatively connected to the vehicle bus 134 and the audio bus 158. The audio component 160 receives analog information, rendering it as sound, via the audio bus 158. Digital information is received via the vehicle bus 134. The audio component 160 provides AM and FM radio, satellite radio, CD, DVD, multimedia and other like functionality independent of the infotainment center 156. Audio component 160 may contain a speaker system (e.g., speaker 130'), or may utilize speaker 130 via arbitration on vehicle bus 134 and/or audio bus 158.

Still referring to FIG. 6, the vehicle crash and/or collision detection sensor interface 152 is/are operatively connected to the vehicle bus 134. The crash sensors 154 provide information to the telematics unit 14 via the crash and/or collision detection sensor interface 152 regarding the severity of a vehicle collision, such as the angle of impact and the amount of force sustained.

Other vehicle sensors 164, connected to various sensor interface modules 166 are operatively connected to the vehicle bus 134. Example vehicle sensors 164 include, but are not limited to, gyroscopes, accelerometers, speed sensors, magnetometers, emission detection and/or control sensors, environmental detection sensors, and/or the like. Additionally, examples of sensor interface modules 166 include powertrain control, climate control, body control, and/or the like.

The vehicle hardware 126 includes the display 180, which may be operatively directly connected to or in communication with the telematics unit 14, or may be part of the audio component 160. The display 180 may be any human-machine interface (HMI) disposed within the vehicle 112 that includes audio, visual, haptic, etc. The display 180 may, in some instances, be controlled by or in network communication with the audio component 160, or may be independent of the audio component 160. Examples of the display 180 include a VFD (Vacuum Fluorescent Display), an LED (Light Emitting Diode) display, a driver information center display, a radio display, an arbitrary text device, a heads-up display (HUD), a touchscreen display, an LCD (Liquid Crystal Diode) display, and/or the like. The display 180 may be referred to herein as a graphic user interface (GUI).

As mentioned above, the system 100 includes the carrier/communication system 116. A portion of the carrier/communication system 116 may be a cellular telephone system or any other suitable wireless system that transmits signals between the vehicle hardware 126 and land network 122. The wireless system 116 may also be used to transmit wireless signals between the device 10 (via a communications module) and the OEM 18 and/or the dealer 20, especially in instances where the communications module includes a cellular chipset (e.g., when the device 10 is a smartphone or a tablet computer). It is to be understood that the wireless system 116 may also be used to establish other types of wireless connections (e.g., a Wi-Fi™ connection) between the device 10 and the dealer 20 and/or the OEM 18. These connections may be established, e.g., when the device 10 is within a wireless connection range of a wireless access point (also known as a hotspot).

According to an example, the wireless portion of the carrier/communication system 116 includes one or more cell towers 118, base stations 119 and/or mobile switching centers (MSCs) 120, as well as any other networking components required to connect the wireless portion of the system 116 with land network 122. It is to be understood that various cell tower/base station/MSC arrangements are possible and could be used with the wireless portion of the system 116. For example, a base station 119 and a cell tower 118 may be co-located at the same site or they could be remotely located, or a single base station 119 may be coupled to various cell towers 118, or various base stations 119 could be coupled with a single MSC 120. A speech codec or vocoder may also be incorporated in one or more of the base stations 119, but depending on the particular architecture of the wireless network 116, it could be incorporated within an MSC 120 or some other network components as well.

Land network 122 may be a conventional land-based telecommunications network that is connected to one or more landline telephones and connects the wireless portion of the carrier/communication network 116 to the call/data center 16. For example, land network 122 may include a public switched telephone network (PSTN) and/or an Internet protocol (IP) network. It is to be understood that one or more segments of the land network 122 may be implemented in the form of a standard wired network, a fiber or other optical network, a cable network, wireless networks, such as wireless local networks (WLANs) or networks providing broadband wireless access (BWA), or any combination thereof.

The service center 16 (also referred to herein as a call center) of the telematics service provider is designed to provide the vehicle hardware 126 with a number of different system back-end functions. According to the example shown in FIG. 6, the call center 16 generally includes one or more switches 168, servers 170, databases 172, live and/or automated advisors 162, 162', processing equipment (or processor) 184, as well as a variety of other telecommunication and computer equipment 174 that is known to those skilled in the art. These various telematics service provider components are coupled to one another via a network connection or bus 176, such as one similar to the vehicle bus 134 previously described in connection with the vehicle hardware 126.

The processor 184, which is often used in conjunction with the computer equipment 174, is generally equipped with suitable software and/or programs enabling the processor 184 to accomplish a variety of call center 16 functions. Further, the various operations of the call center 16 are carried out by one or more computers (e.g., computer equipment 174) programmed to carry out some of the tasks of the call center 16. The computer equipment 174 (including computers) may include a network of servers (including server 170) coupled to both locally stored and remote databases (e.g., database 172) of any information processed.

Switch 168, which may be a private branch exchange (PBX) switch, routes incoming signals so that voice transmissions are usually sent to either the live advisor 162 or the automated response system 162', and data transmissions are passed on to a modem (similar to modem 142) or other piece of equipment (not shown) for demodulation and further signal processing. The modem preferably includes an encoder, as previously explained, and can be connected to various devices such as the server 170 and database 172.

It is to be appreciated that the call center 16 may be any central or remote facility, manned or unmanned, mobile or fixed, to or from which it is desirable to exchange voice and data communications. As such, the live advisor 162 may be physically present at the call center 16 or may be located remote from the call center 16 while communicating therethrough.

The communications network provider 190 generally owns and/or operates the carrier/communication system 116. The communications network provider 190 includes a mobile network operator that monitors and maintains the operation of the communications network 190. The network operator directs and routes calls, and troubleshoots hardware (cables, routers, network switches, hubs, network adaptors), software, and communications. It is to be understood that, although the communications network provider 190 may have back-end equipment, employees, etc. located at the telematics service provider call center 16, the telematics service provider is a separate and distinct entity from the network provider 190. In an example, the equipment, employees, etc. of the communications network provider 190 are located remote from the call center 16. The communications network provider 190 provides the user with telephone and/or Internet services, while the telematics service provider provides a variety of telematics-related services (such as, for example, those discussed hereinabove). The communications network provider 190 may interact with the call center 16 to provide services (such as emergency services) to the user.

While not shown in FIG. 6, it is to be understood that in some instances, the call center 16 operates as a data center, which receives voice or data calls, analyzes the request associated with the voice or data call, and transfers the call to an application specific call center associated with the telematics service provider. In these instances, the telematics service provider may include a plurality of application specific call centers that each communicates with the data center 16, and possibly with each other. It is further to be understood that the application specific call center(s) may include all of the components of the data center 16, but is a dedicated facility for addressing specific requests, needs, etc. Examples of application specific call centers include emergency services call centers, navigation route call centers, in-vehicle function call centers, or the like.

The call center 16 components shown in FIG. 6 may be configured as a Cloud Computer, i.e., an Internet- or world-wide-web-based computing environment. For example, the computer equipment 174 may be accessed as a Cloud platform service, or PaaS (Platform as a Service), utilizing Cloud infrastructure rather than hosting computer equipment 174 at the call center 16. The database 172 and server 170 may also be configured as a Cloud resource. The Cloud infrastructure, known as IaaS (Infrastructure as a Service) typically utilizes a platform environment as a service, which may include components such as the processor 184, database 172, server 170, and computer equipment 174. In an example, application software and services (such as, e.g., navigation route generation and subsequent delivery to the vehicle 112) may be performed in the Cloud via the SaaS (Software as a Service).

Subscribers, in this fashion, may access software applications remotely via the Cloud. Further, subscriber service requests may be acted upon by the automated advisor 162', which may be configured as a service present in the Cloud.

While several examples have been described in detail, it will be apparent to those skilled in the art that the disclosed examples may be modified. Therefore, the foregoing description is to be considered non-limiting.

The invention claimed is:

1. An application for a communications and processing device selected from a tablet computer and a smartphone, the application including a computer program embedded on a non-transitory, tangible medium, the computer program including:

computer readable code for establishing a two-way data transmission connection between the communications and processing device and a telematics unit of a vehicle;

computer readable code for establishing a two-way data transmission connection between the communications and processing device and an information system of an original equipment manufacturer (OEM);

computer readable code for establishing a two-way data transmission connection between the communications and processing device and an information system of a dealer associated with the OEM; and computer readable code for at least i) tailoring at least one vehicle system of the vehicle with user-selected preferences, ii) tailoring a user account associated with the vehicle, and iii) providing information pertaining to the vehicle or to a program associated with the vehicle.

2. The application as defined in claim 1, further comprising:

computer readable code for pulling data from at least one of a telematics service provider through the telematics unit or the information system of the dealer, the information system of the OEM, and the information system of the dealer associated with the OEM; and computer readable code for presenting the data as educational material to an authorized user.

3. The application as defined in claim 2 wherein the data is pulled from the telematics service provider, and wherein the educational material pertains to i) services available to the vehicle as provided by the telematics service provider, ii) how to configure the telematics unit for connectivity with the telematics service provider, iii) how to configure the telematics unit for connectivity with a mobile communications device, iv) emergency services provided by the telematics service provider, v) security services provided by the telematics service provider, vi) navigation services provided by the telematics service provider, and vii) product add ons provided by the telematics service provider.

4. The application as defined in claim 2 wherein the data is pulled from any of the information system of the OEM or the information system of the dealer associated with the OEM, and wherein the educational material pertains to any of i) content specific to vehicle hardware, ii) content specific to vehicle features, iii) content specific to a vehicle lease, iv) dealer maintenance notification (DMN) services, or v) general information of a vehicle brand.

5. The application as defined in claim 1, further comprising:

computer readable code for pulling vehicle data from the telematics unit of the vehicle, the vehicle data pertaining to the at least one vehicle system;

computer readable code for performing vehicle diagnostics based on the pulled vehicle data; and computer readable code for presenting results of the vehicle diagnostics to an authorized user via the communications and processing device.

6. The application as defined in claim 1, further comprising computer readable code for enabling the dealer to access a list of vehicles that have enrolled in a new vehicle onboarding program at the dealer.

7. The application as defined in claim 1, further comprising computer readable code for enabling an authorized user of the vehicle to register, with the application, a user account associated with the vehicle, and to utilize the application after registration.

8. The application as defined in claim 7, further comprising:

computer readable code for enabling the authorized user to one of verify or change information associated with the user account; and computer readable code for enabling the authorized user to sign up for telematics service provider services.

9. The application as defined in claim 1, further comprising computer readable code for providing a limited version of the application when a registration process is skipped.

10. The application as defined in claim 1, further comprising computer readable code for enabling an authorized user to any of view or set the user-selected preferences associated with the at least one vehicle system, the at least one vehicle system being chosen from an in-vehicle navigation system, an in-vehicle radio, and an in-vehicle short range wireless communications system.

11. The application as defined in claim 10, further comprising computer readable code for enabling the authorized user to any of download or remove a setting or an application for the in-vehicle navigation system, the in-vehicle radio, the in-vehicle short range wireless communications system, or combinations thereof.

12. The application as defined in claim 10, further comprising computer readable code for enabling the authorized user to send an electronic mail (e-mail) message to an e-mail account, the e-mail message including instructional material for using the in-vehicle short range wireless communications system or a link to an application store for downloading an available application to a mobile communications device that is to operatively connect to the vehicle via the in-vehicle short range wireless communications system.

13. The application as defined in claim 1, further comprising computer readable code for enabling an authorized user to any of view or set preferences associated with specific vehicle hardware and vehicle features.

14. The application as defined in claim 1, further comprising computer readable code for enabling an authorized user to any of i) schedule service appointments with the dealer associated with the OEM, ii) edit license plate information, iii) edit insurance policy information, iv) edit emergency information, or v) purchase any of products or services from a telematics service provider, the OEM, the dealer associated with the OEM, or combinations thereof.

15. The application as defined in claim 1, further comprising:

computer readable code for generating a summary of actions performed by an authorized user utilizing the application; and computer readable code for providing directional instructions for performing one or more non-performed actions utilizing the application.

16. The application as defined in claim 1, further comprising:

computer readable code for implementing user-selected changes to a setting of the at least one vehicle system; and computer readable code for confirming that the user-selected changes were implemented.

17. A vehicle onboarding system, comprising:

a communications and processing device selected from a tablet computer or a smartphone;

a processor of the communications and processing device; and an application resident on and accessible via the communications and processing device, the application including:

computer readable code for establishing a two-way data transmission connection between the communications and processing device and a telematics unit of a vehicle, computer readable code for establishing a two-way data transmission connection between the communications and processing device and an information system of an original equipment manufacturer (OEM);

computer readable code for establishing a two-way data transmission connection between the communications and processing device and an information system of a dealer associated with the OEM; and computer readable code for i) tailoring of at least one vehicle system with user-selected preferences, ii) tailoring of a user account associated with the vehicle, and iii) enabling access to information pertaining to the vehicle or to a program associated with the vehicle;

each of the computer readable codes being embedded on a non-transitory, tangible medium;

wherein the communications and processing device is configured to any of i) transmit the user-selected preferences from the communications and processing device to the telematics unit, and ii) provide the information.

18. The vehicle onboarding system as defined in claim 17 wherein the communications and processing device is configured to run the application via any of the Internet or a short range wireless connection, and is configured to support a plurality of languages, locales, brands, and combinations thereof.

19. The vehicle onboarding system as defined in claim 17 wherein the application is available to an authorized user, an unauthorized user, and a dealer associated with an original equipment manager, and wherein each of the authorized user, the unauthorized user, and the dealer is provided with respective selected access to portions of the application.

20. The vehicle onboarding system as defined in claim 17 wherein the application, as a whole, is configured to be used to i) set up a new account with a telematics service provider, ii) make changes to the new account or an existing account, iii) configure settings of vehicle systems, iv) provide educational material to a vehicle user, v) purchase any of products or services from the telematics service provider, and vii) obtain vehicle diagnostics selected from oil life, tire pressure, and odometer reading.

21. The vehicle onboarding system as defined in claim 20 wherein the application is configured to be used i) to set up the vehicle prior to a vehicle owner taking possession of the vehicle upon purchase, ii) to update vehicle settings any time during ownership of the vehicle, or iii) a combination of i and ii.

22. An application for a handheld communications and processing device selected from a tablet computer and a smartphone, the application including a computer program embedded on a non-transitory, tangible medium, the computer program including:

computer readable code for establishing a two-way data transmission connection between the handheld communications and processing device and a telematics unit of a vehicle;

computer readable code for establishing a two-way data transmission connection between the communications and processing device and an information system of an original equipment manufacturer (OEM);

computer readable code for establishing a two-way data transmission connection between the communications and processing device and an information system of a dealer of a network of dealers associated with the OEM;

computer readable code to define application access rules for the dealer of the network of dealers associated with the OEM, the application access rules for the dealer outlining dealer functions including at least i) entering vehicle registration information, ii) authenticating the vehicle registration information, iii) viewing any of a vehicle registration status, a vehicle registration record, and a vehicle history, and iii) viewing an expected time of completion for data processing of the vehicle registration information; and computer readable code to define application access rules for a customer of the dealer, the application access rules for the customer outlining customer functions including at least i) tailoring at least one vehicle system of the vehicle with user-selected preferences, ii) tailoring a customer account associated with the vehicle, and iii) providing information pertaining to the vehicle or to a program associated with the vehicle.

23. The application as defined in claim 22 wherein the set of functions further includes registering the customer account with the application.

24. The application as defined in claim 22 wherein the dealer functions are different from, and more limited than the customer functions.

25. An application for a handheld communications and processing device selected from a tablet computer and a smartphone, the application including a computer program encoded on a non-transitory, tangible medium, the application comprising:

a communications module in selective wireless communication with a telematics unit of a vehicle, a dealer information system, and a manufacturer information system;

computer readable code for establishing a two-way data transmission connection between the communications and processing device and the telematics unit;

computer readable code for establishing a two-way data transmission connection between the communications and processing device and the manufacturer information system;

computer readable code for establishing a two-way data transmission connection between the communications and processing device and the dealer information system;

a rules module responsive to at least one of the telematics unit, the dealer information system, and the manufacturer information system, and to selectively provide access to application-related information to any of a dealer or a customer; and a user interface functionally coupled to the communications module and the rules module, the user interface to receive input from any of the customer or the dealer, the input including at least one of i) information to register a customer vehicle, ii) information to tailor at least one vehicle system of the vehicle, and iii) information to register a vehicle service.

* * * * *